US010326847B1

(12) United States Patent
Jammalamadaka et al.

(10) Patent No.: US 10,326,847 B1
(45) Date of Patent: Jun. 18, 2019

(54) SYSTEM AND METHOD FOR ASSESSING SPATIOTEMPORAL IMPACT OF EMERGENCY EVENTS BASED ON SOCIAL MEDIA POSTING BEHAVIOR

(71) Applicant: HRL LABORATORIES, LLC, Malibu, CA (US)

(72) Inventors: Aruna Jammalamadaka, Calabasas, CA (US); Jiejun Xu, Chino, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/870,531

(22) Filed: Jan. 12, 2018

Related U.S. Application Data

(60) Provisional application No. 62/450,891, filed on Jan. 26, 2017.

(51) Int. Cl.
*H04L 29/08* (2006.01)
*H04W 4/021* (2018.01)
*G06Q 50/00* (2012.01)

(52) U.S. Cl.
CPC ............. *H04L 67/18* (2013.01); *G06Q 50/01* (2013.01); *H04L 67/22* (2013.01); *H04W 4/021* (2013.01)

(58) Field of Classification Search
CPC .............................. H04L 67/18; H04W 4/021
USPC ............................... 455/456.1, 414.1, 414.2
See application file for complete search history.

(56) References Cited

U.S. PATENT DOCUMENTS

2016/0322078 A1* 11/2016 Bose .................. G11B 27/031
2017/0262697 A1* 9/2017 Kaps ..................... A63F 13/00

* cited by examiner

*Primary Examiner* — Chuk Huynh
(74) *Attorney, Agent, or Firm* — Lewis Roca Rothgerber Christie, LLP

(57) ABSTRACT

A method for estimating the impact of an event includes: receiving social media posts, each of the social media posts including content, a timestamp, and a geolocation; grouping the social media posts by geographic region in accordance with the geolocation associated with the social media post and by time window in accordance with the timestamp associated with the social media post; extracting feature vectors from the social media posts, each of the feature vectors corresponding to one group of social media posts; supplying the feature vectors to one or more models of events to generate one or more classifications of the groups of social media posts, each of the models of events corresponding to a different kind of event, and the classifications of the groups indicating the level of impact of the different kinds of events; and operating a device based on the classifications of the groups of social media posts.

26 Claims, 12 Drawing Sheets
(5 of 12 Drawing Sheet(s) Filed in Color)

low

FIG. 6A moderate

FIG. 6B high

FIG. 6C very_high

FIG. 6D

SYSTEM AND METHOD FOR ASSESSING SPATIOTEMPORAL IMPACT OF EMERGENCY EVENTS BASED ON SOCIAL MEDIA POSTING BEHAVIOR

CROSS-REFERENCE TO RELATED APPLICATION(S)

This application claims the benefit of U.S. Provisional Patent Application No. 62/450,891, filed in the United States Patent and Trademark Office on Jan. 26, 2017, the entire disclosure of which is incorporated by reference herein.

BACKGROUND

In many emergency events or other types of disruptive circumstances, it is difficult to determine the spatiotemporal impact of the event, in other words, the impact of the event across a geographic area over time. It is often difficult to precisely determine the level of impact of temporally and spatially localized events, such as natural and human-instigated disasters, epidemics, protests, riots, and terrorist attacks, on various regions and on various populations. For example, during and after a natural disaster such as Hurricane Sandy of the 2012 Atlantic hurricane season, government agencies and relief groups manually collected data on the social and economic impact of the event by sending agents to the various locations to assess the situation. However, detailed information about the impact of the event was not available until months or even years after Hurricane Sandy ended, due to the difficulty of compiling, reconciling, and interpreting the collected data. This long delay can cause problems in determining the efficient allocation of resources to communities that need support.

Social media, such as the Twitter® platform, is often used during natural disasters and states of emergency to gauge public response and to disseminate information regarding the event in real-time. Some comparative methods measure the social and economic impact of events by analyzing posts by users of social media services such as Twitter® and Facebook®. However, these comparative methods typically do not estimate the causal effect of a targeted "treatment" or event.

SUMMARY

Aspects of embodiments of the present invention relate to automatically predicting the economic impact of future events and current events in real-time (or in substantially real-time), by analyzing information published to one or more social media networks. Aspects of embodiments of the present invention also relate to systems and methods for developing models for performing the predictions based on the information published on one or more social media networks.

According to one embodiment of the present invention, a method for estimating the spatiotemporal impact of an event includes: receiving, by a processor, a plurality of social media posts, each of the social media posts including content, a timestamp, and a geolocation; grouping, by the processor, the social media posts by geographic region in accordance with the geolocation associated with the social media post and by time window in accordance with the timestamp associated with the social media post to generate a plurality of groups of social media posts; extracting, by the processor, one or more features from each group of social media posts to generate a plurality of feature vectors, each of the feature vectors corresponding to one group of social media posts; supplying, by the processor, the feature vectors to one or more models of events to generate one or more classifications of the groups of social media posts, each of the one or more models of events corresponding to a different kind of event, and the classifications of the groups of the social media posts indicating the level of impact of the different kinds of events; and operating a device based on the classifications of the groups of social media posts.

The operating the device based on the classifications of the groups of social media posts may include displaying the classifications on a map, each of the classifications being shown on a portion of the map corresponding to the region associated with the classification.

The operating the device based on the classifications of the groups of social media posts may further include displaying a sequence of maps, each map of the sequence of maps corresponding to a different time window.

The operating the device based on the classification of the groups of social media posts may further include animating the sequence of maps.

The extracting the one or more features from each group of social media posts may include, for each group of social media posts, counting occurrences of one or more topics in the group of social media posts, each topic including one or more words, the counting occurrences of topics including identifying one or more of the words of a topic in the content of the social media post.

The operating the device based on the classification of the groups of social media posts may include identifying an advertisement based on an event detected by a classification of a group; and transmitting the advertisement to a device located in a geographic region corresponding to the group.

The method may further include identifying an event detected by a classification of a group; and operating the device based on the classification of the groups of social media posts may further include dispatching emergency services to a geographic region corresponding to the group in accordance with the event.

The operating the device based on the classifications of the groups of social media posts may include transmitting data to a relevant user account.

The relevant user account may be a geographically related user account.

According to one embodiment of the present invention, a method for training a plurality of models for detecting the spatiotemporal impact of an event includes: receiving, by a processor, a plurality of social media posts, each of the social media posts including content, a timestamp, and a geolocation; grouping, by the processor, the social media posts by geographic region in accordance with the geolocation associated with the social media post and by time window in accordance with the timestamp associated with the social media post to generate a plurality of groups of social media posts; extracting, by the processor, a plurality of features from the social media posts to generate a plurality of feature vectors, each feature vector corresponding to one of the social media posts; receiving, by the processor, labeled data corresponding to one or more classifications of the level of impact of the event in a plurality of geographic regions and a plurality of times; assigning, by the processor, a classification to each of the groups of social media posts in accordance with the level of impact of the event on the geographic regions corresponding to the groups; computing, by the processor, a causal impact between the plurality of features of each group and the classification of the group to identify one or more causally impacted features of the plurality of features; generating, by the processor, a model relating the causally impacted features with the classifications; and returning, by the processor, the model.

The classification of each of the groups may include an unaffected classification and an affected classification, and the computing the causal impact to identify one or more causally impacted features may include, for each feature of the feature vector: generating a time series of values for the feature from an affected group; generating one or more time series of values for the feature from one or more unaffected groups; estimating a first posterior predictive distribution utilizing the time series from the affected group and the one or more time series of values from the unaffected groups; calculating a first p-value over multiple simulations of the first posterior predictive distribution; estimating a second posterior predictive distribution utilizing the one or more time series of values from the unaffected groups, without the affected group; calculating a second p-value over multiple simulations of the second posterior predictive distribution; and determining the feature as a causally impacted feature when the first p-value is less than 0.05 and the second p-value is greater than or equal to 0.05.

The extracting the plurality of features may include identifying a plurality of topics in the social media posts, the identifying the plurality of topics including: removing stop words from the content of the social media posts; removing low frequency words from the content of the social media posts; and applying a topic model to generate a plurality of topics, each of the topics including a plurality of words.

The grouping the social media posts may include sampling social media posts from the plurality of geographic regions of the labeled data.

The grouping the social media posts may further include sampling social media posts from regions outside the plurality of geographic regions of the labeled data.

According to one embodiment of the present invention, a system for estimating the spatiotemporal impact of an event includes: a processor; and memory coupled to the processor and having instructions stored thereon that, when executed by the processor, cause the processor to: receive a plurality of social media posts, each of the social media posts including content, a timestamp, and a geolocation; group the social media posts by geographic region in accordance with the geolocation associated with the social media post and by time window in accordance with the timestamp associated with the social media post to generate a plurality of groups of social media posts; extract one or more features from each group of social media posts to generate a plurality of feature vectors, each of the feature vectors corresponding to one group of social media posts; supply the feature vectors to one or more models of events to generate one or more classifications of the groups of social media posts, each of the one or more models of events corresponding to a different kind of event, and the classifications of the groups of the social media posts indicating the level of impact of the different kinds of events; and return the classifications of the groups of social media posts.

The memory may further store instructions that, when executed by the processor, cause the processor to return the classifications of the groups of social media posts by displaying the classifications on a map, each of the classifications being shown on a portion of the map corresponding to the region associated with the classification.

The memory may further store instructions that, when executed by the processor, cause the processor to display a sequence of maps, each map of the sequence of maps corresponding to a different time window.

The memory may further store instructions that, when executed by the processor, cause the processor to animate the sequence of maps.

The memory may further store instructions that, when executed by the processor, cause the processor to extract the one or more features from each group of social media posts by, for each group of social media posts, counting occurrences of one or more topics in the group of social media posts, each topic including one or more words, the counting occurrences of topics including identifying one or more of the words of a topic in the content of the social media post.

The memory may further store instructions that, when executed by the processor, cause the processor to identify an advertisement based on an event detected by a classification of a group; and transmit the advertisement to a device located in a geographic region corresponding to the group.

The memory may further store instructions that, when executed by the processor, cause the processor to identify an event detected by a classification of a group; and dispatch emergency services to a geographic region corresponding to the group in accordance with the event.

According to one embodiment of the present invention, a system for training a plurality of models for detecting the spatiotemporal impact of an event includes: a processor; and memory coupled to the processor and having instructions stored thereon that, when executed by the processor, cause the processor to: receive a plurality of social media posts, each of the social media posts including content, a timestamp, and a geolocation; group the social media posts by geographic region in accordance with the geolocation associated with the social media post and by time window in accordance with the timestamp associated with the social media post to generate a plurality of groups of social media posts; extract a plurality of features from the social media posts to generate a plurality of feature vectors, each feature vector corresponding to one of the social media posts; receive labeled data corresponding to one or more classifications of the level of impact of the event in a plurality of geographic regions and a plurality of times; assign a classification to each of the groups of social media posts in accordance with the level of impact of the event on the geographic regions corresponding to the groups; compute a causal impact between the plurality of features of each group and the classification of the group to identify one or more causally impacted features of the plurality of features; generate a model relating the causally impacted features with the classifications; and output the model.

The classification of each of the groups may include an unaffected classification and an affected classification, and the memory may further store instructions that, when executed by the processor, cause the processor to identify the one or more causally impacted features by, for each feature of the feature vector: generating a time series of values for the feature from an affected group; generating one or more time series of values for the feature from one or more unaffected groups; estimating a first posterior predictive distribution utilizing the time series from the affected group and the one or more time series of values from the unaffected groups; calculating a first p-value over multiple simulations of the first posterior predictive distribution; estimating a second posterior predictive distribution utilizing the one or more time series of values from the unaffected groups, without the affected group; calculating a second p-value over multiple simulations of the second posterior predictive distribution; and determining the feature as a causally impacted feature when the first p-value is less than 0.05 and the second p-value is greater than or equal to 0.05.

The memory may further store instructions that, when executed by the processor, cause the processor to extract the plurality of features by identifying a plurality of topics in the social media posts, the identifying the plurality of topics including: removing stop words from the content of the social media posts; removing low frequency words from the content of the social media posts; and applying a topic model to generate a plurality of topics, each of the topics including a plurality of words.

The memory may further store instructions that, when executed by the processor, cause the processor to group the social media posts by sampling social media posts from the plurality of geographic regions of the labeled data.

The memory may further store instructions that, when executed by the processor, cause the processor to group the social media posts by sampling social media posts from regions outside the plurality of geographic regions of the labeled data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIGS. 6A, 6B, 6C, and 6D are causal impact plots for the feature "reshare count," illustrating the impact of Hurricane Sandy over time, as reflected in the social media posting behavior of people in variously impacted regions.

DETAILED DESCRIPTION

Figure 1:
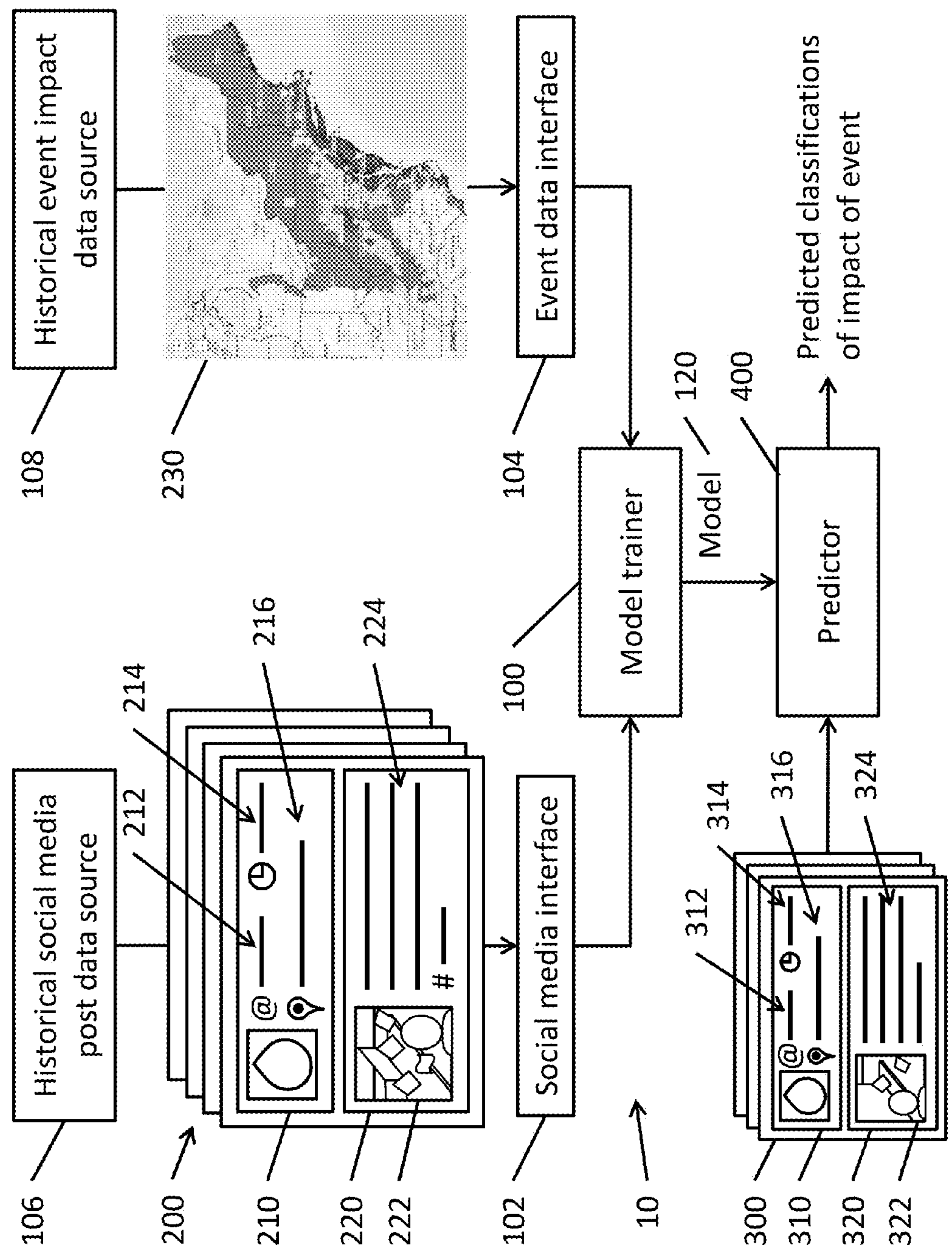
FIG. 1 is a block diagram of a system according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Understanding the spatial and temporal impact of events or conditions on various populations that may be affected by the event can, among other uses, provide intelligence on current ground conditions to help aid organizations in allocating resources to support regions in need of help, and can help organizations adapt fiscal or economic policies to current conditions. This information may generally be difficult to obtain due to the lack of sources of information in the affected areas, and current efforts may rely on inconsistent sensor networks, agents of government and aid organizations, researchers, and journalists. Furthermore, as noted above, formal studies of the impact of events on regions within a geographic area are often not available until long after the event is over, and therefore these studies generally are not useful for informing the allocation of immediate aid.

Aspects of embodiments of the present invention are directed to systems and methods for automatically estimating the social impact of naturally occurring and human instigated events such as hurricanes and bombings over a monitored geographic area, as well as estimating the evolution of the impact over time and space (e.g., across the geographic area) by analyzing information published by people or data sources in the monitored geographic area. According to some embodiments of the present invention, the information is extracted from social networks (e.g., Twitter®, Facebook®, Instagram®, Google+®, and the like), and, in particular, posts made by users (e.g., humans or bots) on the social network.

Some aspects of embodiments of the present invention are directed to training one or more models of social media posting behavior. For example, the model may associate or correlate historical event impact data (e.g., data from the Federal Emergency Management Agency (FEMA) or other relief organizations relating to the social impact of an event on an area) over a period of time and in a number of different regions with posts made on social media over the same time period by people in the same regions. Training the model may include extracting features derived from the social media data as measures of "normal" social media posting behavior (e.g., during periods of time and from regions that are not affected by an event) and performing a causal impact analysis, such as a Bayesian structural time-series (BSTS), on each of the features to determine which posting behaviors become more or less common as a result of the event.

Aspects of embodiments of the present invention apply causal models to social media posts to assess the impact of an event on social media. In addition, aspects of embodiments of the present invention are directed to apply the causal model to identify converse estimations or predictions (e.g., the impact of an event based on social media posts). For example, monitoring social media in real-time (or in substantially real-time) may reveal particular current patterns of social media posts. The current patterns of social media posts may then be compared or correlated with the patterns of social media behavior in existing models of such behavior derived during a training process. A match between the current patterns and at least one of the models suggests that the event corresponding to the model is currently impacting the regions in which embodiments of the present invention observe those behavior patterns.

As such, aspects of embodiments of the present invention are directed to automatically assessing the current spatiotemporal impact of events based on data published in real-time (or in substantially real time), such as social media postings. The types of assessments may include, but are not limited to: assessments of the impact of events that adversely affect populations, such as natural disasters, terrorist attacks, protest events, riots, and the like; and assessments of the causal impact of advertising and social media marketing campaigns on target audiences.

FIG. 1 is a block diagram of a system according to one embodiment of the present invention. Referring to FIG. 1, in one embodiment of the present invention, a prediction system 10 includes a model trainer 100, a social media interface 102, an event data interface 104, and a predictor 400. The social media interface 102 is configured to receive historical social media posts 200 from a historical social media post data source 106 (e.g., an external source). For example, the social media interface 102 may interact with an application programming interface (API) provided by the historical social media post data source 106. One example of a social media post data source 106 is the Gnip® Historical PowerTrack (from Gnip, Inc. of Boulder, Colo.) provides access to the full archive of public Twitter® posts. In some embodiments, the historical social media post data source may be generated by collecting and storing posts from social networks over time. For example, the Gnip® Data Collector (from Gnip, Inc. of Boulder, Colo.) may also be used to collect public posts from Twitter®, Facebook®, Instagram®, Google+®, and the like in real-time, substantially real-time, or otherwise published on the social media network (e.g., while the posts are still accessible on the social media network). As still another example, the Gnip® Decahose can deliver a 10% sample of all public Tweets. The posts collected in real-time may be stored in a database or other persistent data storage system.

Each historical social media post 200 may include metadata 210 and content 220. The metadata 310 may include a username 212, a timestamp 214, and a geolocation 216. The timestamp 214 may be a representation of the time at which the post was published (e.g., a date and time, where the time may be associated with a time zone, set to a particular time zone such as Greenwich Mean Time, or represented in a time zone agnostic manner, such as epoch time or Unix time). The geolocation 216 is a representation of the location of the post (e.g., the location of the computing device that was used to upload the post at the time of the upload, and/or a location specified by the user when creating the post). The geolocation may be represented as longitude and latitude coordinates, an address, the name of a point of interest, and the like. The content 220 of the post may include, for example, an image 222 and/or text 224. In some circumstances, the content may include other types (or kinds) of data either as part of or separate from the image 22 and/or text 224, where non-limiting examples of these other types (or kinds) of data may include uniform resource locators (URLs), hyperlinks, hashtags, audio, barcodes, emoji or emoticons, and the like.

The event data interface 104 is configured to receive historical event data 230 from a historical event data source 108. The historical event data 230 may include classifications reflecting the level of impact of an event on a particular region at a particular time. In the example shown in FIG. 1, the historical event data 230 includes FEMA classifications of the level of impact of Hurricane Sandy on various regions in the geographic area of the northeastern United States over time, where the levels of impact include "low" (shown in green), "moderate" (shown in yellow), "high" (shown in red), and "very high" (shown in purple). The various regions may be defined by shapefiles, e.g., boundaries defined by longitude and latitude.

The historical social media posts 200 and the historical event data 230 are supplied to the model trainer 100, which generates a model 120 that represents a causal relationship between features extracted from the social media posts 200 and the historical event data. In other words, the model 120 represents how social media users change their posting habits in accordance with the level of impact of the event on those users.

The model 120 generated by the model trainer 100 can be stored for later use, such as by the predictor 400. The predictor 400 may receive current social media posts 300 from a real-time or substantially real-time source. For example, as noted above, the Gnip® Decahose and Data Collector products can provide real-time or near real-time posts from a plurality of social media networks. Like the historical social media posts 200, the current social media posts 300 may include metadata 310 and content 320. The metadata 310 may include a username 312, a timestamp 314, and a geolocation 316, and the content 320 may include an image 322 and/or text 324, or other content, as described above. The predictor 400 predicts classifications of the impact of an event from the current social media posts 300 by extracting features from the current social media posts and supplying the extracted features to the model 120 (or multiple models) generated by the model trainer 100.

Model Training

Figure 2:
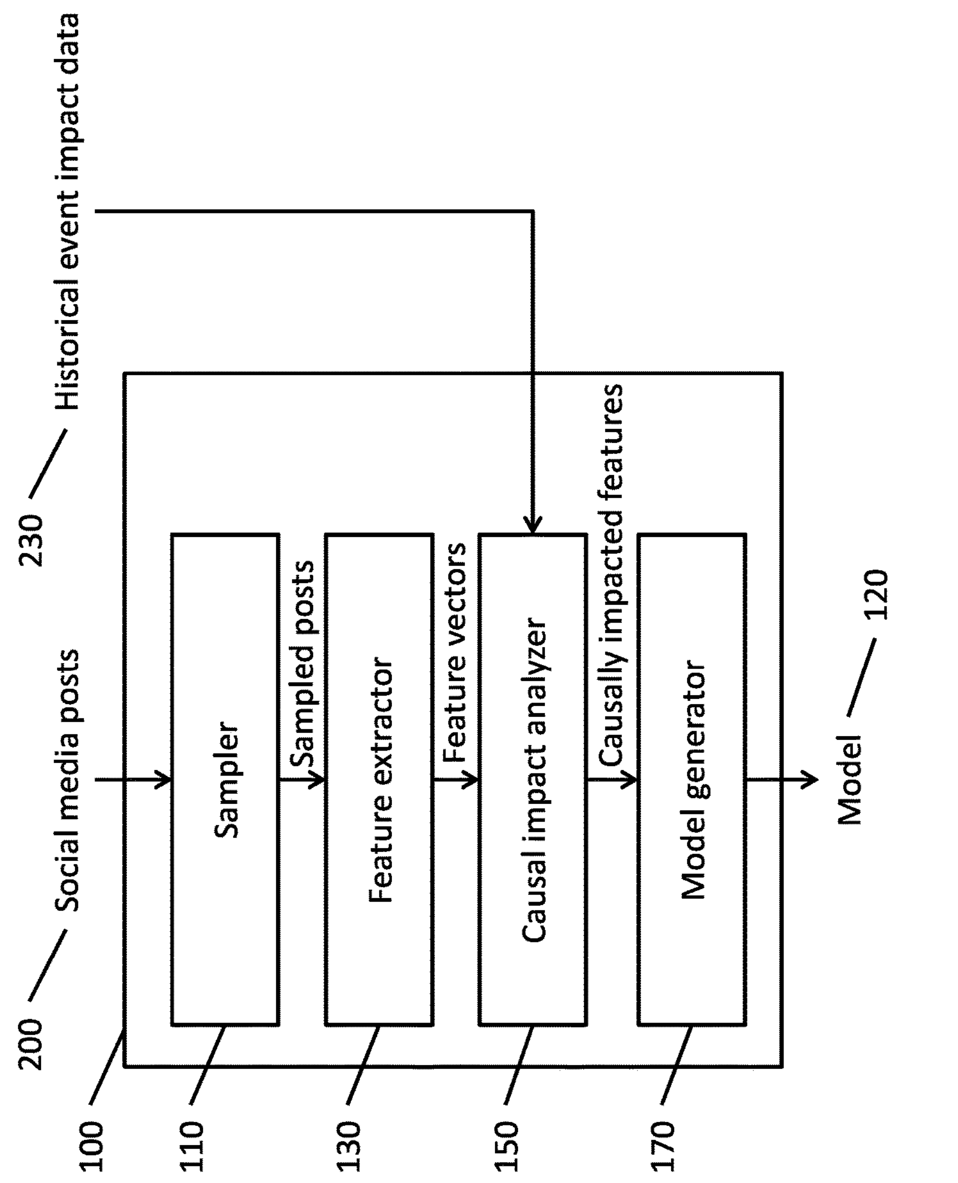
FIG. 2 is a block diagram of a training module according to one embodiment of the present invention.
Figure 3:
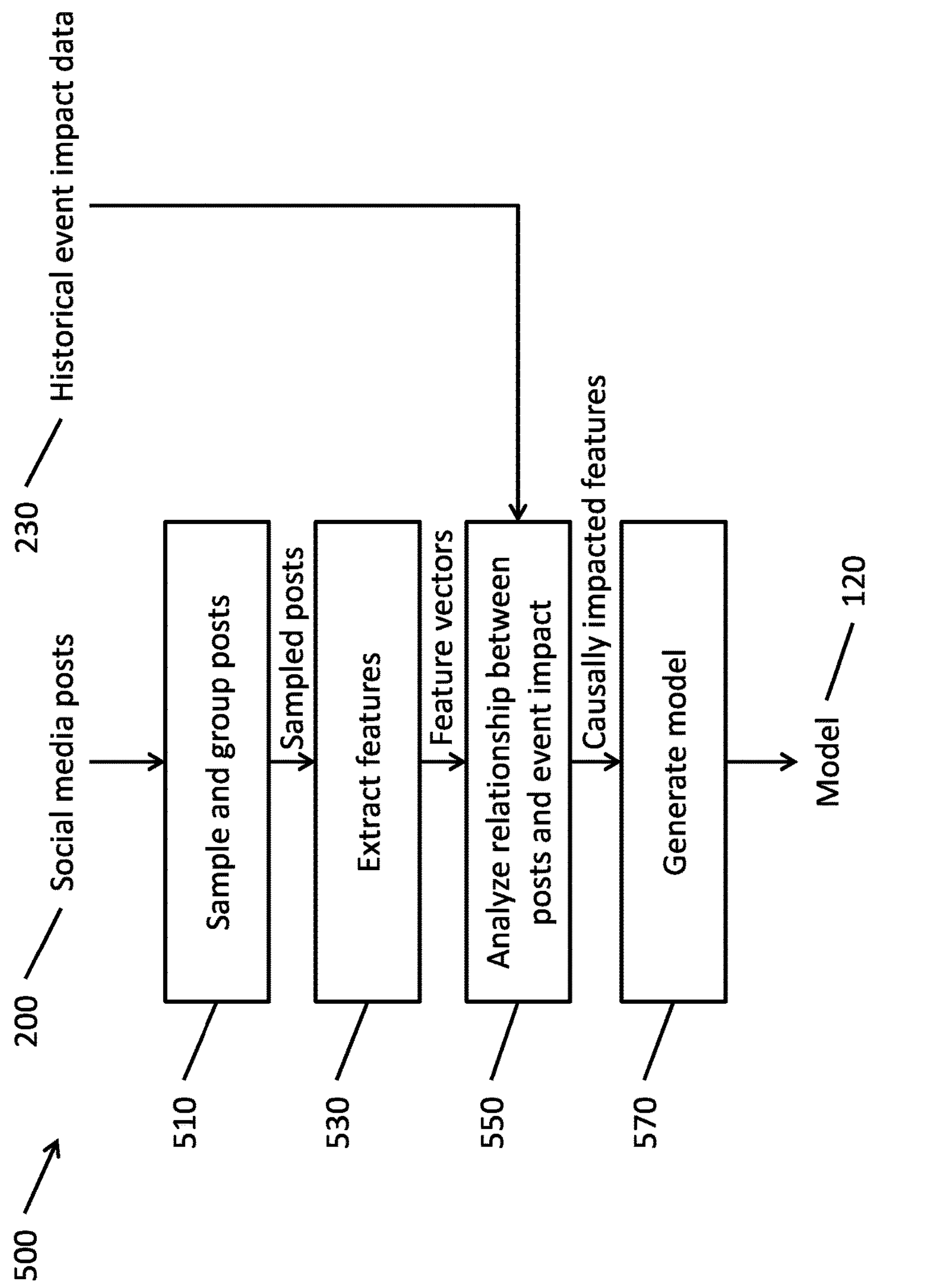
FIG. 3 is a flowchart depicting a method for training a model according to one embodiment of the present invention.

FIG. 2 is a block diagram of a training module according to one embodiment of the present invention, and FIG. 3 is a flowchart depicting a method for training a model according to one embodiment of the present invention.

For the purposes of discussion below, aspects of embodiments of the present invention will be described in the context of analyzing social media posting behavior at or around the time of Hurricane Sandy in 2012 and at or around the time of the Boston Marathon bombing in April 2013. However, embodiments of the present invention are not limited thereto and may be applied to other events and other types of events.

As discussed above, historical social media posts 200 are supplied to the model trainer 100. In one embodiment shown in FIG. 2, the model trainer 100 includes a sampler 110. Referring to FIG. 3, in one embodiment, in operation 510 the sampler 110 samples from the historical social media posts 200 received via the interface. The sampling may be performed to restrict the posts to a particular restricted set of randomly selected users that are located in the affected geographic region (or "affected population") as well as a separate set of randomly selected users that are located outside the affected geographic region (or "unaffected population"). In some embodiments, the users are geocoded (e.g., associated with particular regions) using principles of homophily, as described in, for example, Compton, Jurgens, and Allen "Geotagging one hundred million twitter accounts with total variation minimization," 2014 IEEE International Conference on Big Data, 393-401 (IEEE 2014), the entire disclosure of which is incorporated by reference herein. The sampler 110 may be configured to match demographics of the randomly selected affected and unaffected populations such as age, ethnicity, and income. This level of demographic information is not always available, and therefore, in some embodiments, population-level propensity score matching is performed using census data (e.g., when considering populations in the United States, data from the United States Census Bureau). In some embodiments, a large set of users, (e.g., 10,000 users) is selected for each region, which may further mitigate the effect of confounders (e.g., confounding facts, confounding data, and/or confounding users) on the samples.

As noted above, embodiments of the present invention are described in the context of training one or more models using historical social media posts 200 sampled from social media posts that were made surrounding Hurricane Sandy and the Boston Marathon Bombing. In some embodiments, posts are sampled for a time period extending before and after the event (e.g., the period from six months prior to the event to six months after the event.

Figure 7:
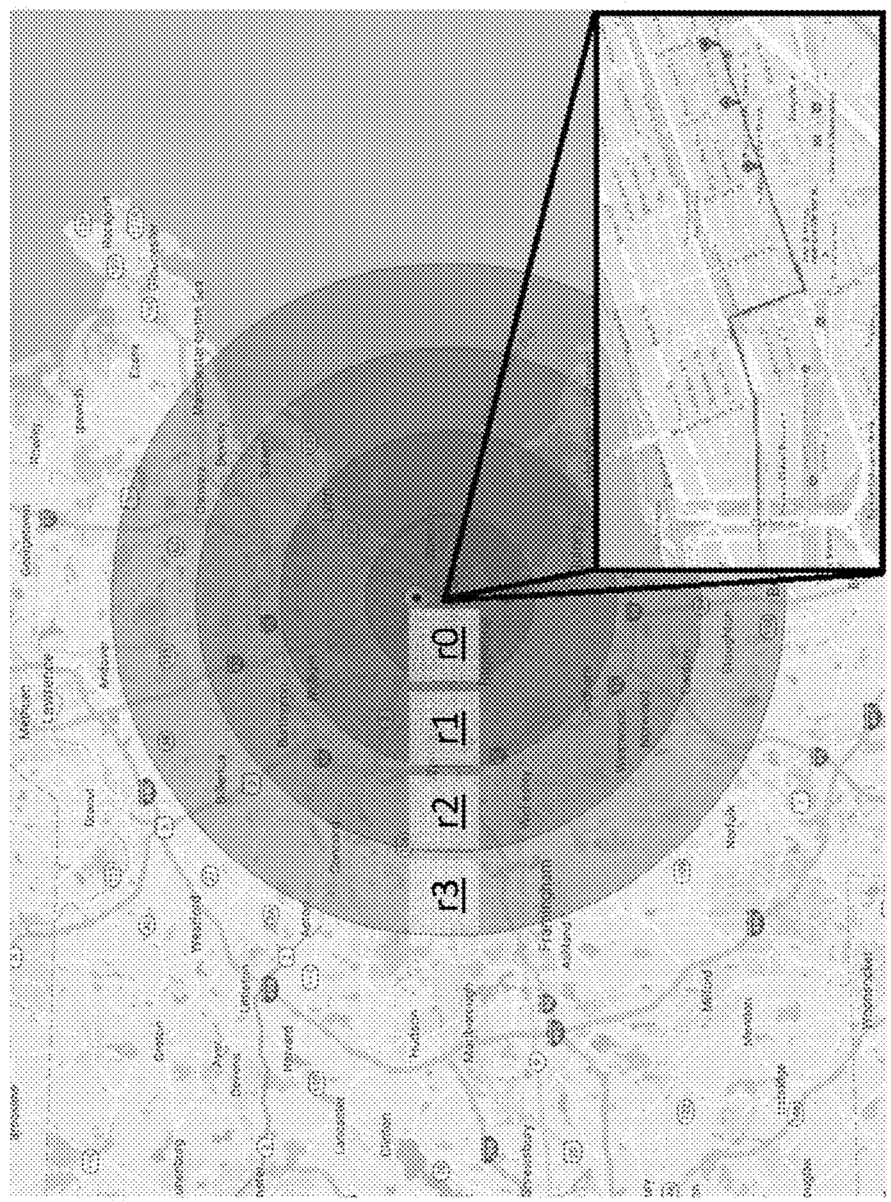
FIG. 7 is a map of a portion of the city of Boston with four concentric circles indicating different distances from the site of the bombing of the Boston Marathon in 2013.

In the case of Hurricane Sandy, FEMA reports defined affected areas and their corresponding level of impact from the hurricane ("low impact," "moderate impact," "high impact," and "very high impact", see FIG. 7), and the report may be used as a basis for the historical event data 230. Unaffected states are loosely matched by 2012 United States Census data for population level, age, ethnicity, and income. As such, a large set of social media users (e.g., 10,000) is sampled from each of the four impact classifications ("low impact," "moderate impact," "high impact," and "very high impact") of the regions defined in the FEMA reports, for a population of 40,000 affected social media users, as well as 10,000 social media users from each of four different unaffected regions (e.g., California, Georgia, Illinois, and Texas), for a population of 40,000 unaffected social media users, selected for matching population level, age, ethnicity, and income to the affected social media users.

The Boston Marathon Bombing took place on Apr. 15, 2013 at 2:49 pm EDT. It is assumed that the impact decayed with distance from the location of the bomb blast. As such, four radial ranges are defined: a first range of 0 to 5 miles ("r0"), a second range of 5 to 10 miles ("r1"), a third range of 10 to 15 miles ("r2"), and a fourth range of 15 to 20 miles ("r3") (see FIG. 9). Ten thousand social media users are sampled from each of the four ranges (r0, r1, r2, and r3), for a total population of 40,000 affected social media users. In a manner similar to the above, ten thousand unaffected users ae sampled from each of four different unaffected cities, selected for matching population level, age, ethnicity, and income to the affected social media users (e.g., Chicago, District of Columbia, Los Angeles, and New York).

In operation 530, a plurality of features are extracted from the sampled posts by identifying characteristics within the sampled posts. In some embodiments, some of the features relate to counts of shares of a post (e.g., "retweets" in the case of Twitter®), instances of one user mentioning another user name in the content of the post (e.g., an "@mention" in Twitter®), tags (e.g., "hashtags" in Twitter®), and hyperlinks or URLs.

In some embodiments, sentiment values are calculated to determine the attitude of the user with respect to the topic. For example, in one embodiment, sentiment values are calculated by averaging unigram values (over tweets and then over days) from the National Research Council (NRC) Hashtag Sentiment Lexicon (see, e.g., NRC-Canada: Building the State-of-the-Art in Sentiment Analysis of Tweets, Saif M. Mohammad, Svetlana Kiritchenko, and Xiaodan Zhu, In Proceedings of the seventh international workshop on Semantic Evaluation Exercises (SemEval-2013), June 2013, Atlanta, USA.), which includes a list of common words, hashtags, and emoticons and their corresponding sentiment values (e.g., a real-valued score numerical score that relates to whether the word is associated with a "positive" or "negative" sentiment, for example, where $-\infty$ refers to "most negative" sentiment and $+\infty$ refers to the "most positive" sentiment).

In some embodiments of the present invention, a topic model is applied to the sampled posts to obtain one topic per post. In one embodiment, a Dirichlet Multinomial topic model may be applied (see, e.g., Yin, J. and Wang, J. A Dirichlet multinomial mixture model-based approach for short text clustering. In *Proceedings of the 20th ACM SIGKDD international conference on knowledge discovery and data mining,* 233-242. ACM.) using the implementation described in, for example, Nguyen, D. Q. jLDADMM: A Java package for the LDA and DMM topic models. (2015). Processing social media posts made over a long period (e.g., the six months before the event and the six months after the event), helps the topic model to avoid formation of topics relating directly to the event in question (e.g., avoiding the formation of a "Boston Marathon bombing" topic or a "Hurricane Sandy" topic, which would not be generalizable) in favor of more general topics that are similar across event data sets. In one embodiment of the present invention, the topic model is applied to the combination of the posts from the affected areas, one class at a time with all of the sampled posts from the unaffected population (e.g., in one run, the posts from the "low impact" population combined with all of the posts from the unaffected population, and in another run, the posts from the "high impact" population combined with all of the posts from the unaffected population) so that the affected areas and topic do not overpower the word-topic distributions.

To pre-process the text, in one embodiment, the feature extractor 130 removes topic non-alphabetic characters, words less than three letters long, punctuation, and stop words from the post. The list of stop words to be removed may include, for example, words from the NLTK toolkit (see, e.g., Bird, S., Klein, E., and Loper, E. Natural Language Processing with Python. O'Reilly Media (2009).), and may further include stop words that are specific to particular social networks. For example, Twitter®-specific stop words may include "rt," "via," "amp," and "http." In some embodiments, the feature extractor also removes low occurrence words, e.g., words appearing less than 100 times in the data (the "corpus").

In some embodiments of the present invention, the topic model is run with parameters number of topics=10, $\alpha$=0.01 and $\beta$=0.1, where $\alpha$ is the parameter of the Dirichlet prior on the per-document topic distributions, and $\beta$ is the parameter of the Dirichlet prior on the per-topic word distribution. However, embodiments of the present invention are not limited thereto, and the parameters may be adjusted or set based on the characteristics of the historical social media posts.

Table 1, below, illustrates a set of topics extracted, in one embodiment of the present invention, for the Hurricane Sandy and Boston Marathon Bombing events, along with the top ten words from each of the word-topic distributions. As seen in Table 1, in this example, there is significant overlap in the topics and words automatically extracted from social media posts surrounding the Boston Marathon Bombing and Hurricane Sandy, differing only in a "News" topic that appears in the Boston Marathon posts and an additional "Opinions2" topic that appears in the Hurricane Sandy posts.

TABLE 1

(some redacted)

| Example words | Topic name | Boston Topic | Sandy Topic |
|---|---|---|---|
| lol, like, shit, f_, get, got, n_, b_, l_, a_ | Profanity | 1 | 4 |
| love, like, lol, happy, birthday, one, know, good, thanks, day | Appreciation | 2 | 3 |
| get, day, like, good, school, going, time, lol, today, tomorrow | Daily greetings | 3 | 7 |
| que, por, con, los, para, una, las, como, pero, del | Spanish | 4 | 10 |
| game, like, win, get, team, good, tonight, play, one, time | Sports | 5 | 8 |
| follow, new, followers, please, retweet, back, photo, love, one, teamfollowback | Twitter related | 6 | 2 |
| like, get, want, lol, got, love, need, hair, one, right | Needs | 7 | 6 |
| people, like, love, know, never, life, get, someone, want, one | Opinions | 8 | 5 |
| new, video, music, check, https, youtube, party, get, love, tonight | Multimedia | 9 | 1 |
| new, today, people, one, o_, boston, get, news, like, time | News | 10 | n/a |
| like, people, know, get lol, s_, f_, hate, really, want | Opinions2 | n/a | 9 |

As such, in some embodiments of the present invention, the feature vectors representing the posts include one or more of the following: the frequency of appearance of the various topics, the number of posts per user, the total number of posts (or post count), the total number of users (or user count), the number of tags (or hashtags or tag count), the number of URLs (or URL count), the number of mentions of other users (or mention count), the number of reshares or retweets (or reshare count), and the average sentiment. These feature vectors may be aggregate counts over a sequence of time periods (e.g., aggregated daily counts) for each region, which are supplied to the causal impact analyzer 150.

In operation 550, the causal impact analyzer 150 of the model trainer 100 analyzes a relationship between the feature vectors representing the sampled posts and the historical event impact data 230 in order to identify features that correspond to the model. In particular, each feature of the feature vector may be analyzed to determine whether it is causally impacted by the event.

According to one embodiment of the present invention, a Bayesian structural time-series (BSTS) model is used to construct a synthetic control or "counterfactual" to estimate the behavior that would have been expected in the absence of the event, thereby enabling estimation of the causal effect of the event.

Figure 4:
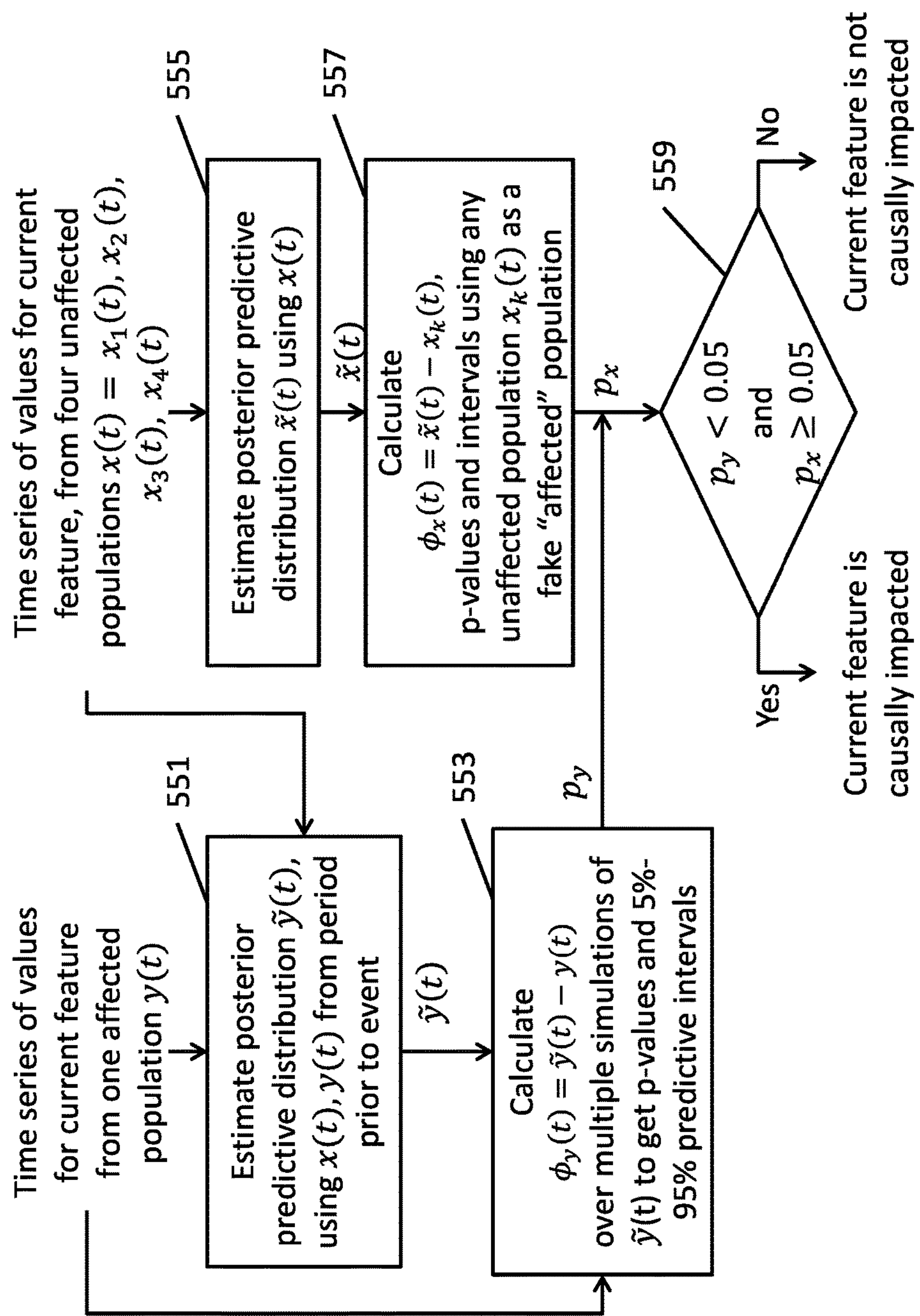
FIG. 4 is a flowchart depicting a method for selecting features during the training of the model according to one embodiment of the present invention.

FIG. 4 is a flowchart depicting a method for selecting determining whether a feature is causally impacted during the training of the model according to one embodiment of the present invention. The causal impact analyzer 150 may iterate over the features of the feature vectors, applying the method shown in FIG. 4 to consider each feature of the feature vector independently when determining whether or not it is causally impacted, by applying the BSTS model.

Referring to FIG. 4, a time series of values for the current feature from one affected population y(t) is supplied along with time series of values for the current feature from multiple unaffected populations (e.g., four unaffected populations $x_1(t),x_2(t),x_3(t),x_4(t)$). For example, in the case of the Boston Marathon Bombing, the time series of one feature from the population in radial range r0 may be supplied as y(t), and the time series of values for the same feature from the unaffected populations in Chicago, District of Columbia, Los Angeles, and New York may be supplied as the unaffected populations $x_1(t)$, $x_2(t)$, $x_3(t)$, $x_4(t)$.

The time series values y(t) for the current feature may be referred to as the observation equation:

$$y(t)=Z^T(t)\alpha(t)+\in(t),\in(t)\sim N(0,H(t))$$

where y(t) is the observed data at time t, in this case the feature measurement of the affected population. Z(t) and H(t) are partly-known structural parameters sand $\alpha(t)$ is a vector of latent variables called the "state." A "transition equation" represents the change of $\alpha$:

$$\alpha(t+1)=T(t)\alpha(t)+\eta(t),\eta(t)\sim N(0,Q(t))$$

where T(t) and Q(t) are block-diagonal structural parameters and $\eta(t)$ may be of a dimension lower than $\alpha(t)$. The state vector $\alpha(t)$ is generally broken into three parts: trend, seasonal, and regression components.

For the sake of convenience, in some embodiments of the present invention, a model that includes only a local linear trend is applied, and contemporaneous co-variates from unaffected populations with static regression coefficients. In other words, the observation equation y(t) that includes only the local linear trend can be represented as:

$$y(t)=\mu(t)+\beta^T x(t)+\eta(t)$$

The local level state component assumes that the trend is a random walk, e.g., that u(t+1)~N($\mu$(t), 0.01). In some embodiments, model parameters $\theta=\{\sigma_{\in}\beta\}$ and the state vectors $\alpha=\{\alpha_1, \ldots, \alpha_n\}$ are estimated using Markov chain Monte Carlo (MCMC) sampling. In some embodiments, a spike and slap prior is placed on $\beta$, as described, for example, in Scott, S. L., Varian, H. R.: Predicting the present with Bayesian structural time series. International Journal of Mathematical Modelling and Numerical Optimisation 5(1-2), 4-23 (2014).

In operation 551, the causal impact analyzer 150 estimates a posterior predictive distribution $\tilde{y}(t)$ using x(t) and y(t) from the period prior to the event. In other words, the posterior predictive distribution $\tilde{y}(t)$ is the model prediction of the "counterfactual" response and reflects what feature values would have been observed in the affected population, after the event, had event not occurred. Computing the posterior predictive distribution $\tilde{y}(t)$ (or posterior inference) may include sampling the posterior parameters p($\theta$, $\alpha$|y(i) for i$\in$[1,n]) using Gibbs sampling. The sampled posterior parameters can and the BSTS model can be used to estimate the posterior predictive distribution p($\tilde{y}$(i) for i $\in$[n+1, m]|$\theta$, x(j) for j$\in$[1: m]) for the part of the time series that is unobserved. The model defines the feature value y in terms of the unaffected populations x, parameters $\beta$ and state vector $\alpha$. The difference between $\tilde{y}(t)$ and the observed y(t) provides the estimate of the causal impact at time t.

Estimating the posterior predictive distribution $\tilde{y}(t)$ involves defining the time period during which the event has impacted the population (from onset of the event to end) in order to isolate the data from before the beginning of the event. This time period may be referred to herein as the "intervention" or "treatment." In some embodiments of the present invention, the period corresponding to the event can be automatically determined by varying the start and stop and analyzing the prediction intervals of the resulting causal impact plots, as described in more detail below.

Figure 5:
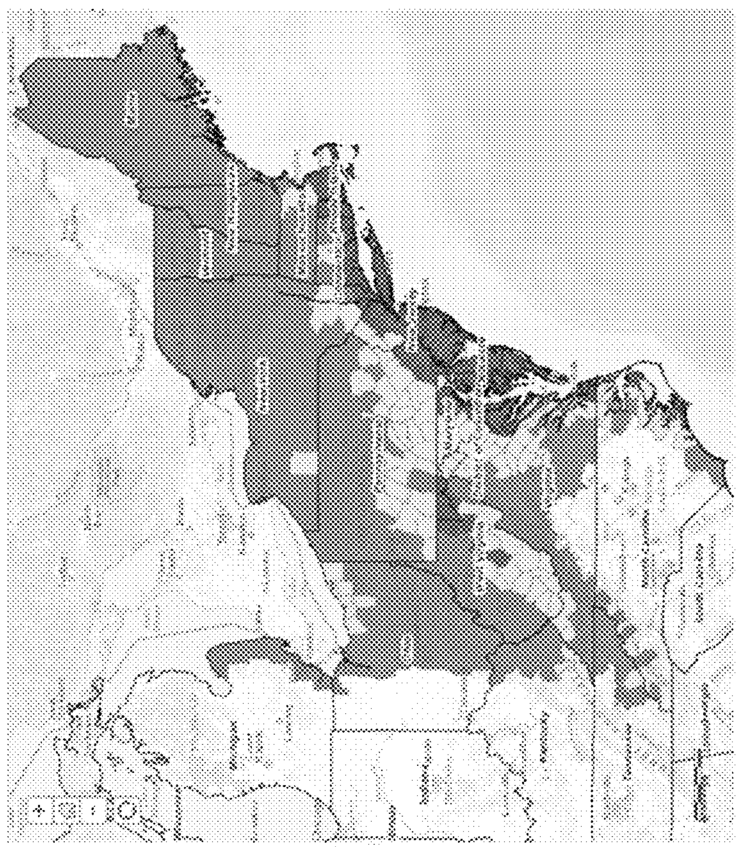
FIG. 5 is a block diagram of a prediction module according to one embodiment of the present invention.

FIG. 5 is a map of a portion of the eastern United States that was affected by Hurricane Sandy in 2012 and classifications of economic impact in each region within the eastern United States.

FIGS. 6A, 6B, 6C, and 6D are causal impact plots for the feature "reshare count," illustrating the impact of Hurricane Sandy over time, as reflected in the social media posting behavior of people in variously impacted regions.

FIG. 7 is a map of a portion of the city of Boston with four concentric circles (labeled r0, r1, r2, and r3) indicating different distances from the site of the bombing of the Boston Marathon in 2013.

FIGS. 8A, 8B, 8C, and 8D are graphs of causal impact plots for the feature "news," illustrating the impact of the Boston Marathon bombing over time and at various radial ranges from the site of the explosions, as reflected in the social media posts of people at various distances from the bombing.

As shown by the vertical dashed lines in FIGS. 6A, 6B, 6C, and 6D, using this technique, the period of impact of Hurricane Sandy is temporally localized to October 27 to November 2, which is consistent with the official timeline of Hurricane Sandy, which was first determined to be heading towards the northeast United States on October 24, hit landfall on October 29, and dissipated on November 2.

The beginning of the period of impact of the Boston Marathon Bombing was more clearly temporally defined than Hurricane Sandy, as the event began on Apr. 15, 2013 at 2:49 PM EDT when the bombs were set off. As shown by the vertical dashed lines in FIGS. 8A, 8B, 8C, and 8D, using this technique, the period of impact of the Boston Marathon Bombing ended one week later on April 22nd.

(Some of the periodicity in the data shown in FIGS. 6A, 6B, 6C, 6D, 8A, 8B, 8C, and 8D results from higher posting activity during weekdays than weekends.)

Based on the temporal windows of the pre-treatment, treatment, and post-treatment tests may be applied to test the statistical significance of the results, as described in more detail below.

One test of the statistical significance of a feature is to sum the feature inside the affected time period and compare the actual observed sum to the distribution of counterfactual predicted sums. In operation 553, the causal impact analyzer 150 calculates $\phi_y(t)=\tilde{y}(t)-y(t)$ over multiple simulations of the posterior predictive distribution $\tilde{y}(t)$ to obtain p-values $p_y$ and 5%-95% predictive intervals. In this case, $\phi(t)$ represents the discrepancy between the estimated posterior predictive distribution and the observed values of the current feature.

Another test of the statistical significance is to confirm the absence of an effect on the unaffected populations. In operation 555, the causal impact analyzer 150 also estimates $\tilde{x}(t)$, that is, the "posterior predictive distribution" of the unaffected populations, and in operation 557, a corresponding $\phi(t)=\tilde{x}(t)-x_k(t)$ is calculated over multiple simulations of $\tilde{x}(t)$, where $x_k(t)$ is any of the unaffected populations (e.g., any of $x_1(t),x_2(t),x_3(t),x_4(t)$) along with p-values $p_x$ and 5%-95% predictive intervals.

The p-value $p_y$ represents a confidence that there is a causal impact between the event and the affected population, and the p-value $p_x$ represents the confidence that there is a causal impact between the event and the unaffected population. In operation 559, the causal impact analyzer determines whether $p_y<0.05$, in other words, whether there is a significant causal relationship between the feature and the affected population, and also determines whether $p_x \geq 0.05$, in other words, confirming that there is not a significant causal relationship between the unaffected populations and the feature. If both of these conditions are met, then the causal impact analyzer determines that the current feature is causally impacted. If not, then the current feature is not causally impacted.

Both of these conditions ($p_y<0.05$ and $p_x \geq 0.05$) need to be met. For example, if $p_y \geq 0.05$ then there would be no significant relationship between the affected population and the feature, and if $p_x<0.05$, then the feature also suggests that the event affected the unaffected population, which, by construction, would not be true.

Returning to FIG. 3, the result of operation 550 is the identification of one or more causally impacted features. In operation 570, the features identified as being causally impacted by the event are gathered to generate a model that specifies a relationship between a particular set of features and an event. In some embodiments, the model represents a function mapping the plurality of causally impacted features of an input plurality of social media posts made by a population to a classification of the impact of a particular type of event (e.g., a terrorist attack, a hurricane, or an advertising campaign) on that population. For example, the model by identify particular words, phrases, hashtags, tweet frequency, and other characteristics that indicate that the population has been affected by a particular type of event.

In some embodiments, multiple such models may be trained based on data sets surrounding different types of events. For example, the Hurricane Sandy data may be used to generate one model, and the Boston Marathon Bombing data may be used to generate another model. As further examples of types of events, social media and impact data surrounding a major earthquake may be used to generate a separate model, and data surrounding a flooding event may be used to generate still another model.

The various models generated through the training process can be stored in a model store (see, e.g., FIG. 9) or persistent data store (e.g., in non-volatile memory such as a disk drive or a flash memory drive) for later retrieval and usage.

Using Trained Models to Make Predictions

Some aspects of embodiments of the present invention are directed to using the models that are generated, as described above, to make predictions or estimates of the level of impact that an event has had on a particular population (e.g., a population in a particular region) at a particular time or over a particular time period. Some embodiments of the present invention may be applied in real-time or substantially real time to assess the recent or current impact of an event on a population.

Figure 9:
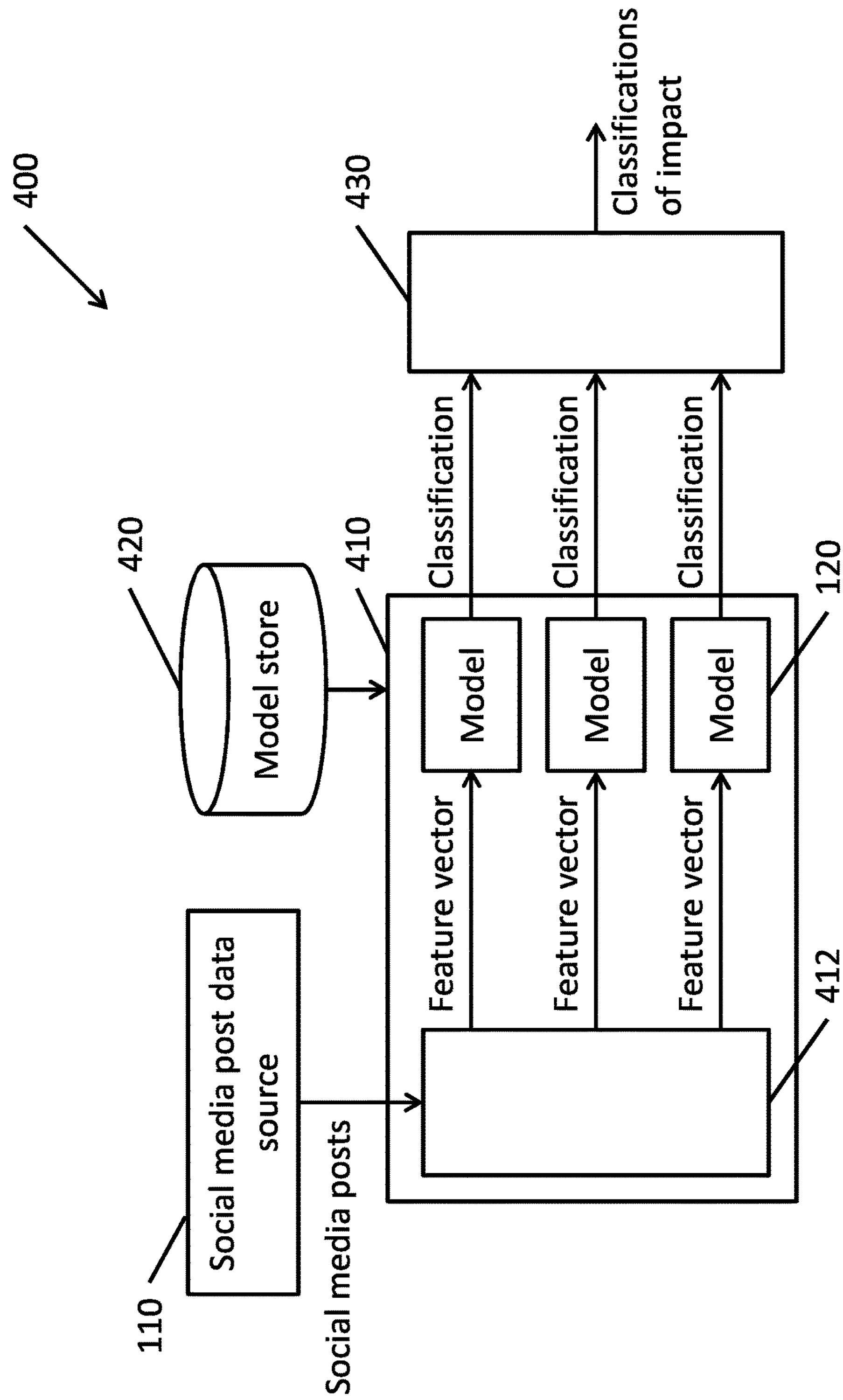
FIG. 9 is a flowchart depicting a method for predicting the impact of an event according to one embodiment of the present invention.
Figure 10:
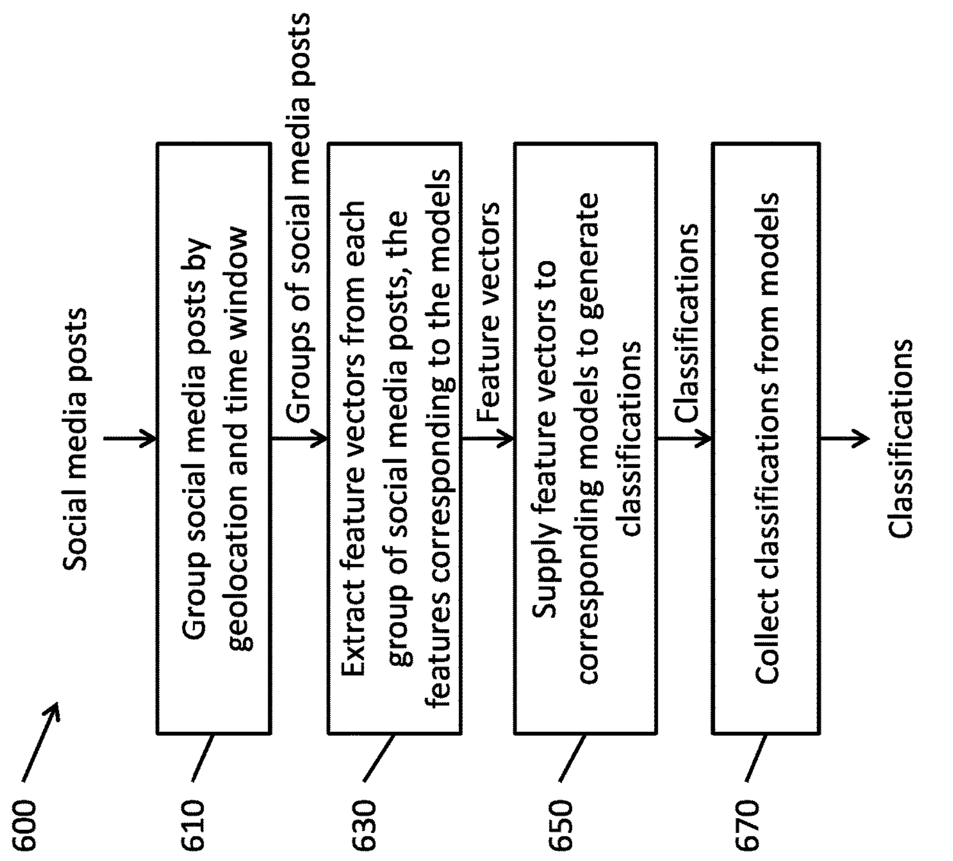
FIG. 10 is a map of a portion of the eastern United States that was affected by Hurricane Sandy in 2012 and classifications of economic impact in each region within the eastern United States.

FIG. 9 is a block diagram of a prediction module according to one embodiment of the present invention. FIG. 10 is a flowchart depicting a method 600 for predicting the impact of an event according to one embodiment of the present invention.

Referring to FIG. 9, in one embodiment the predictor 400 includes a model tester 410, which includes one or more models 120 that may be loaded from the model store 420. The models 120 of the model tester 410 are configured to receive social media posts from a social media post data source 110, which may provide a set of social media posts. The set of social media posts may be sampled from a particular population of interest, such as a particular region or group that may have been affected by an event.

The model tester 410 may include a feature extractor 412 that, in operation 610, samples from the social media posts, grouping the social media posts by geolocation and time window. For example, posts having a location corresponding to or falling within a particular region of interest (e.g., a particular city or county) is grouped with other posts having a location in the same region. The posts may be further grouped by time window. For example, in the case where a time window is one day, all posts corresponding to the same day are grouped together. As such, each region may be associated with a plurality of groups of posts, each group of posts corresponding to a different day. (Equivalently, each time window may include a plurality of groups of posts, each group corresponding to a different region.).

In operation 630, the model tester 410 generates a plurality of features vectors from each group of social media posts (e.g., each group corresponding to one region and one time window), where the feature vectors correspond to the inputs of the models (e.g., the causally impacted features). For example, a first model may include total post count and count of the topic "news" (e.g., the number of times one or more words associated with the "news" topic appeared in a post) as causally impacted features, where another model may include total post count and count of the topic "sport" (e.g., the number of times one or more words associated with the "sport" topic appeared in a post) as causally impacted features. The feature extractor may be configured to extract the relevant features from the social media posts to generate feature vectors. Each of the generated feature vectors may be different, as each may correspond to the particular set of features expected by the corresponding model 120.

The model tester 410 may then, in operation 650, supply the generated feature vectors to the models 120. Each model 120 may, in turn, generate a classification that represents the extent to which the features of the social media posts indicate that they were affected by the particular type of event associated with the model. For example, a model trained on the data from Hurricane Sandy may output a classification that indicated the degree to which the social media posts reflect that the population making those posts were affected by a hurricane. As another example, a model trained on the data from the Boston Marathon Bombing would output a classification that indicated the degree to which the social media posts reflect that the population making those posts were affected by a bombing or other type of terrorist attack.

The classifications generated by the models 120 may then be supplied to a classification summarizer 430, which, in operation 670, generates a collection of classifications arising from the social media posts. For example, the model trained on hurricane data may classify the social media posts as being indicative of "high" impact from a hurricane and the model trained on bombing data may show a "no impact" from a bombing, thereby suggesting that the population that the posts are sampled from are affected by a hurricane and not by a bombing. In some embodiments, the output of the classification summarizer 430 only includes the non-null classifications (e.g., leaving out classifications that indicate that the population is unaffected by the particular type of event associated with the model).

As such, aspects embodiments of the present invention are directed to using trained models to automatically estimate or predict the impact of events on populations based on social media posts made by those populations.

In some embodiments of the present invention, the results may be visualized by displaying the impacted regions on a map. For example, the various regions may be displayed as outlines, and the level of impact of an event may be shown using shading or coloring. Furthermore, the impact of different types of events may be shown on the same map using different colors or different shading. More concretely, regions that are estimated or predicted to be impacted by a hurricane may be marked in varying shades of blue, where light blue indicates low impact and dark blue indicates high impact. In the same way, regions affected by an earthquake may be marked in varying shades of red, where light red indicates low impact and dark red indicates high impact. In this way, the level of impact of different types of events across a geographic region can be estimated using social media posts, and visually assessed by entities interested in monitoring such effects.

The display of the data may also allow users to track the progress of the event over time. For example, each set of social media posts analyzed by the predictor 400 may correspond to a particular region during a particular time period (e.g., one particular day). By analyzing a plurality of sets of social media posts over a series of time periods (over multiple days), changes in the classifications of the social media posts can indicate the level of impact of events on those populations over time. These classifications can be displayed on a map, and the time sequences may be animated over time (e.g., chronologically sorting the classifications) such that the user can observe the evolution of the impact of the event over the course of the event.

In some embodiments of the present invention, the results may be used to generate updates and alerts regarding a region in which an event occurred and/or where the population has been affected at a high, medium, or low level. The updates or alerts may be shown to a relevant user (e.g., as an email notification, a text message, a social media notification, or another type of notification on a computing device such as a smartphone, tablet computer, desktop computer, or laptop computer). The relevant users (e.g., user accounts) may be selected based on whether they are geographically related, which may include users or user accounts near the region in which the event occurred or users or user accounts that are socially or otherwise connected to users associated with the region in which the event occurred. The relevant users or user accounts may further be selected based on their occupation (e.g., emergency responders) or their subscription to a notification service. The update or alert may include maps (or hyperlinks to maps, which may open in a web browser or in another application) as described above. The update or alert may also include the name of the location or region affected by an event (e.g., the alert may include the text "hurricane affecting Washington D.C. metro area" or "terrorist attack affecting Boston").

The update or alert may also be supplied as input to a control system. For example, a computer system may receive the updates or alerts and use the information contained in the updates or alerts to take actions in consideration of the alerts in accordance with one or more control algorithms, as described in more detail below.

Experimental Results

To test the systems and methods described above, models were trained, spatially, on Federal Emergency Management Agency (FEMA) declarations of the impact of Hurricane Sandy as well as on radial distance from the location of the Boston Marathon bombing, and temporally based on the affected time periods of the events. The results, discussed below, show that embodiments of the present invention can enable further understanding of behavioral deviations resulting from terrorist strikes, natural disasters, and protest events.

Table 2 presents a list of features that were determined to be causally impacted in the posts surrounding Hurricane Sandy, organized by FEMA impact region, and Table 3 presents a list of features that were determined to be causally impacted in the posts surrounding the Boston Marathon Bombing, organized by radial range:

TABLE 2

| Feature | Very high | High | Moderate | Low |
|---|---|---|---|---|
| Tweet count | X | X | X | X |
| Daily 6 | X | X | X | X |
| Number of @mentions | X | X | X | |
| Retweet count | X | X | X | |
| Opinions2 8 | X | X | X | |
| Hashtag count | | X | X | X |
| URL count | | X | X | X |
| Tweets per user | | X | X | |
| Sentiment mean | | X | | |
| News 0 | X | | X | |
| Number of users | | | X | |

TABLE 3

| Feature | 0-5 mi | 5-10 mi | 10-15 mi | 15-20 mi |
|---|---|---|---|---|
| News 9 | X | X | X | X |
| Twitter related 5 | X | X | X | X |
| Spanish 3 | X | X | X | |
| Hashtag count | | X | X | X |
| Sports 4 | X | X | | |
| URL count | X | | | |

Figures 6A, 6B, 6C, 6D:
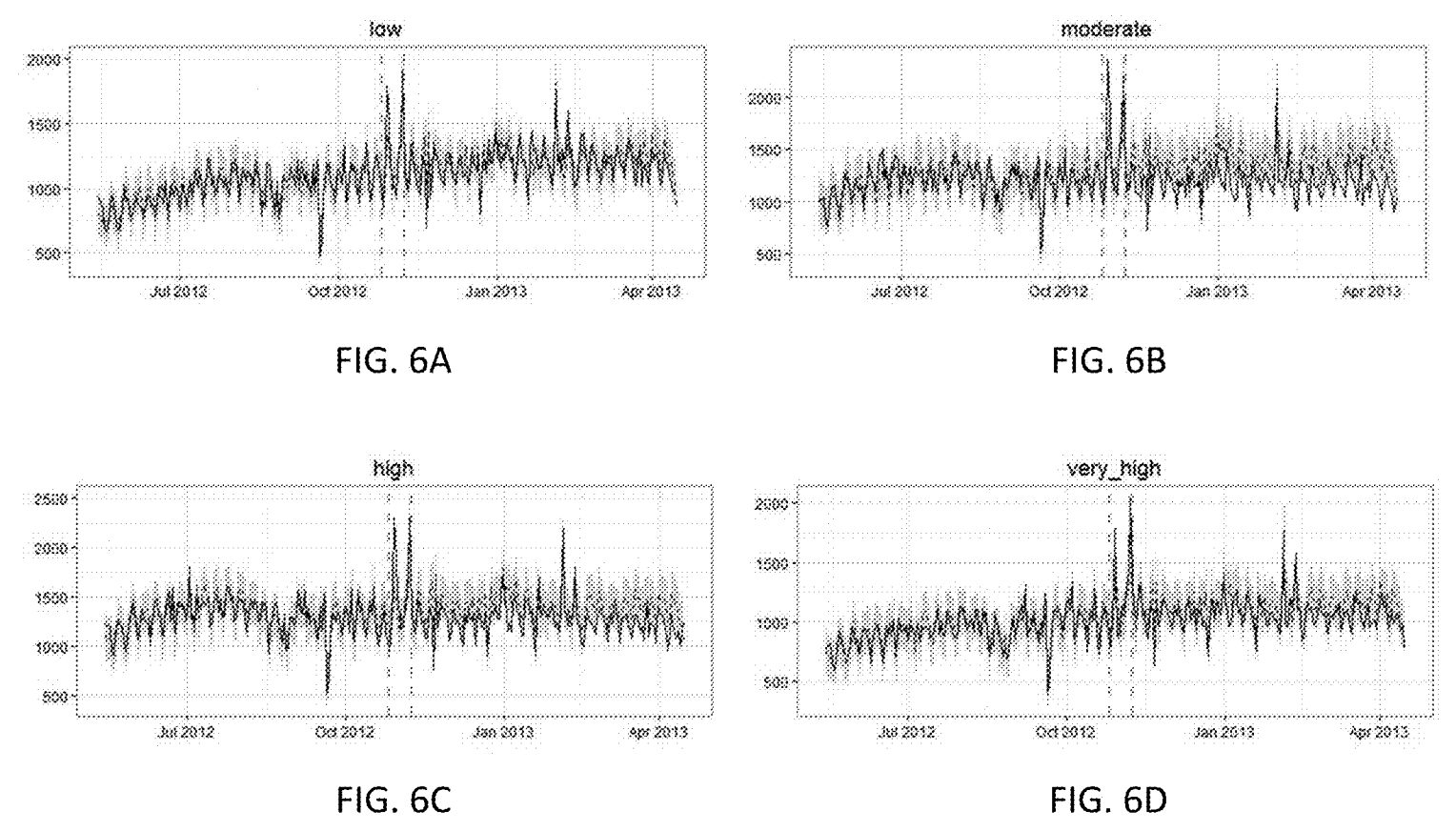
Figure 8B:
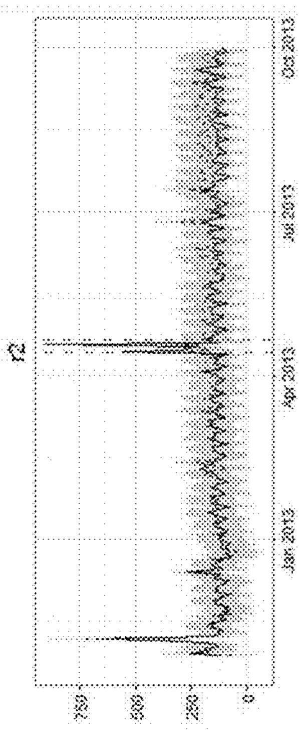
FIGS. 8A, 8B, 8C, and 8D are graphs of causal impact plots for the feature "news," illustrating the impact of the Boston Marathon bombing over time and at various radial ranges from the site of the explosions, as reflected in the social media posts of people at various distances from the bombing.
Figure 8D:
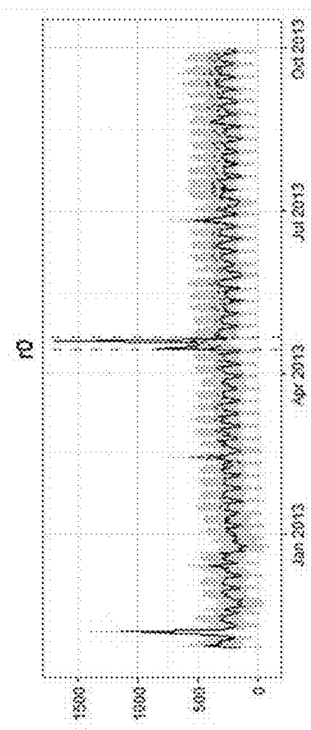
Figure 8A:
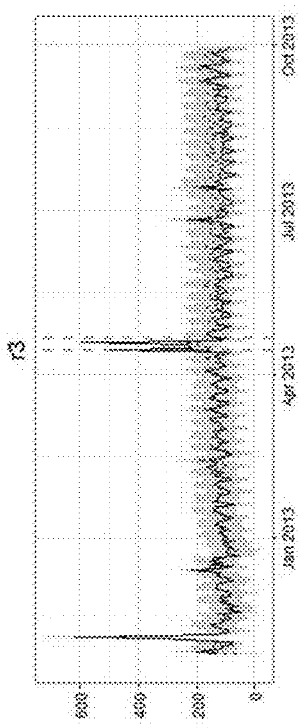
Figure 8C:
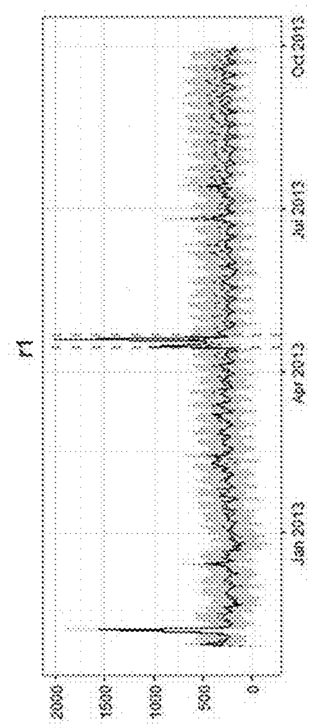

As shown in FIGS. 6A, 6B, 6C, 6D, 8A, 8B, 8C, and 8D, there are significant increases in impact (differences between the posterior prediction and observed time series data) from the region of lowest expected impact (e.g., "low impact" in FIG. 6A or "r3" in FIG. 8A) to the second to highest (e.g., "high" in FIG. 6C or "r1" in FIG. 8C). The most impacted regions ("very high" in FIG. 6D and "r0" is FIG. 8D) may show lower levels of activity due to the event preventing users from accessing (or having attention for) social media networks.

Example Implementations

As noted above, aspects of embodiments of the present invention improve the ability to predict the spatiotemporal impact of events in comparison to prior art techniques for performing such an analysis. Embodiments of the present invention can be used for any purpose that is trying to make predictions of impacts of events on populations and, based on such a prediction (i.e., predicted state change), the system can operate a device. As a non-limiting example, the system can be used to identify possible significant events affecting the physical and mental conditions of people in a geographic area.

As described above, embodiments of the present invention can generate alerts that are sent to a user. The alerts may include maps that depict the affected regions, such as the map shown in FIG. 7, and the alerts may be delivered using electronic messaging systems, including email, text message, instant message, notifications on computer systems (e.g., smartphones, tablet computers, desktop computers, and laptop computers), and the like. The alerts may include the name or other identification of the location (e.g., GPS coordinates or a latitude and longitude) affected by an event. The alerts may also include hyperlinks to reports generated by the system, where the reports may include a map as well as representative samples of social media posts that gave rise to the detection of the particular event. The reports may also represent multiple events occurring in a geographic region or multiple neighboring or nearby geographic regions.

Figure 11:
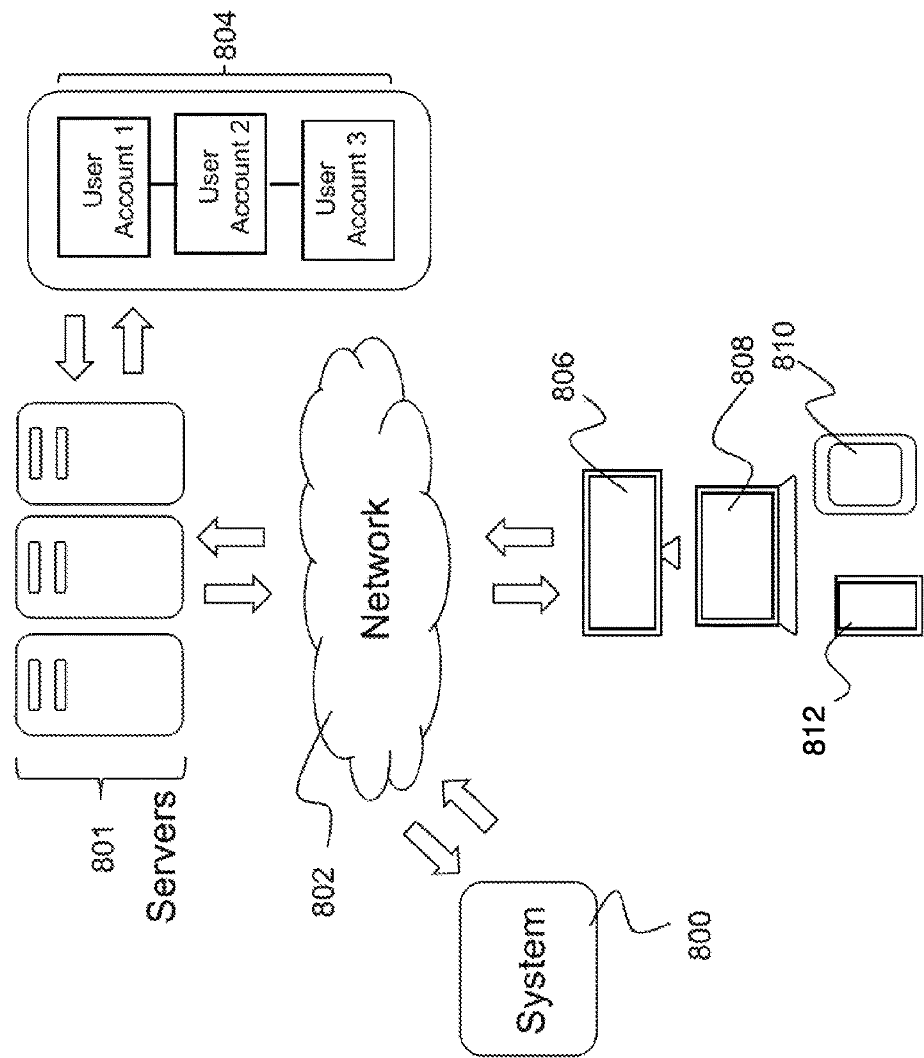
FIG. 11 is a block diagram illustrating various computerized systems communicating with one other which may be used to implement embodiments of the present invention.

FIG. 11 is a block diagram illustrating various computerized systems communicating with one other which may be used to implement embodiments of the present invention.

As shown in FIG. 11, a system 800 according to some embodiments of the present disclosure connects with servers 801 (e.g., device to be operated) to perform the operations described herein, such as generating a report or sending a message based on the predicted state change. In such an example, the servers 801 could include social media servers or other electronic communications devices configured to send alerts to users regarding events.

As another example of operating a device, the system could use a display, or transmit information via a network card or wireless receiver or network, or transmit information regarding the detected event using any other suitable mechanism or technique as understood by those skilled in the art. As another example, the device operation includes outputting information about the detected event (including its location and level of impact) via at least one of a display and a network transmission.

The system 800 connects via a network 802 to servers 801 to send and receive information relating to various social media network of interconnected user accounts (element 804) that are accessed via mobile and non-mobile devices, non-limiting examples of which include desktop computers 806, laptop computers 808, smartphones 810, and other mobile devices 812. Non-limiting examples of user accounts (element 804) include Facebook® user accounts and Twitter® user accounts. As can be appreciated by one skilled in the art, the user device is any device that can receive and transmit data via the network 802. Additionally, a user account may be a user account of a social media platform, which may or may not be capable of receiving targeted marketing.

In some embodiments, the system can be used for security or safety purposes. For example, if a particular detected event relates to civil unrest or desired or undesired events or trends, the system can be configured to generate and transmit an alert of the forecast (e.g., via e-mail, text, etc.), such as to notify police, account administrators, or other interested persons, via a display, website, social media account, a message from a server to a client, and/or one or more messages sent via text message or email to a recipient or interested party.

Embodiments of the present invention may also be used as inputs to a control system. For example, the control system may be a component of an emergency response system that is configured to dispatch available and/or nearby persons to the region. These persons may include emergency medical providers (e.g., first responders, paramedics, and the like) to areas, fire department personnel, and police. The particular parties dispatched to a geographic area may depend on the type of event that is detected (e.g., injuries, fire, disorder, and the like), the geographic location of the event (e.g., identifying parties corresponding to the jurisdictions of the regions affected by the event), and the magnitude of the response (e.g., the number of fire fighters to send out).

As another example, the control system may be a component of a system for delivering advertisements, such as pushing advertisements to a user's social media account via a network or, in another example, generating and transmitting an alert regarding the prediction, such as to an account administrator. For example, the system can be used for advertising purposes to detect the occurrence of events and send out online advertisements and/or alerts based on those predictions. More specifically, the system can be used to provide enhanced services, such as personalization and recommendations regarding a particular product or service based on the occurring event.

In other aspects, the servers 801 can be social network platforms or advertisement delivery networks to access information or automatically provide targeted information and/or advertisements to a display screen on a communication device (elements, 806, 808, 810, 810) via a social network account (element 804). The targeted information may provide, for example, information about local shelters and resources in accordance with the particular needs of the impacted population. Targeted advertisements may include, for example, advertisements about the availability of products and services in the area, such as a particular gas station advertising that they are still open for business during a disaster, a local sporting goods store indicating that they have camp stoves, tents, and other camping equipment available for purchase, and advertisements offering particular services (e.g., animal and livestock rescue services). The targeted information may be delivered based on the location of a user's device (e.g., a cellphone, or a device with a built-in GPS).

As another example, some embodiments of the present invention may be applied to the economic operations of an enterprise. For example, companies having significant operations that are severely impacted by particular major events (e.g., natural disasters) may experience impact on their stock prices due to the interruption of service, and an alert may be used to determine whether to buy or sell shares of stock in the affected companies. As another example, major events (e.g., a hurricane) can impact the demand for products in those impacted regions. For example, emergency supplies, shelf-stable food, and potable water may be in higher demand than luxury items in affected areas. As such, embodiments of the present invention may allow retailers to obtain some early information about the event and to modify product delivery schedules and plans for the impacted regions (e.g., sending trucks with additional non-perishable food and water rather than new televisions), or to modify logistics plans (e.g., rerouting trucks due to road closures, identifying different sources of products due to airport and seaport shutdowns, train schedule changes, or other transportation issues).

Computers and Other Processors

Various portions of embodiments of the present invention that refer to the use of a "processor" may be implemented with logic gates, or with any other embodiment of a processing unit or processor. The term "processing unit" or "processor" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

Figure 12:
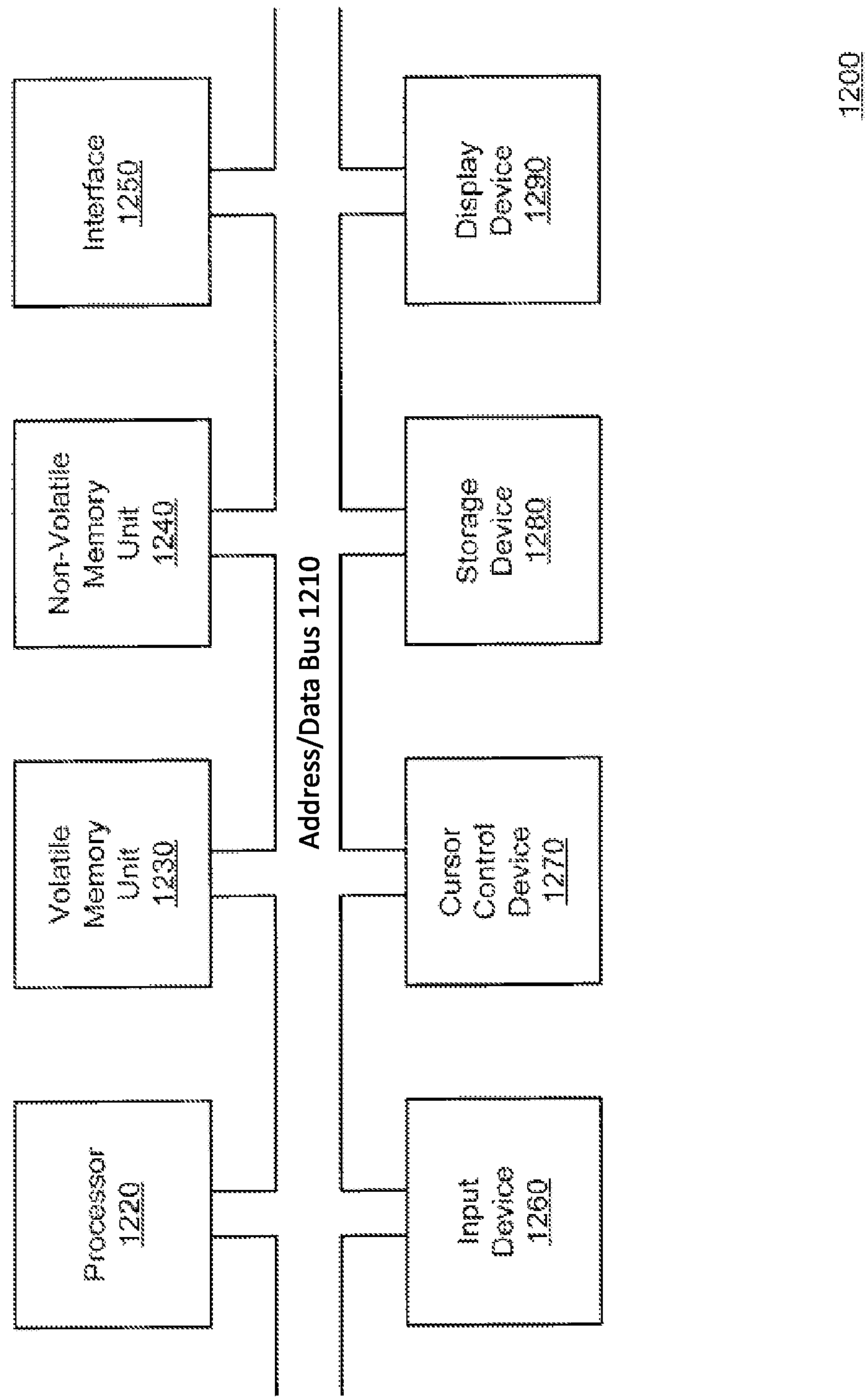
FIG. 12 is a block diagram illustrating a processing system, a processor, or a portion of a processing system or processor used in conjunction with at least one embodiment of the present invention.

FIG. 12 is a block diagram illustrating a processing system, a processor, or a portion of a processing system or processor, referred to herein as a computer system, used in conjunction with at least one embodiment of the present invention.

An exemplary computer system 1200 in accordance with an embodiment is shown in FIG. 12. Exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing unit, such as processor 1220, are coupled with address/data bus 1210. Processor 1220 is configured to process information and instructions. In an embodiment, processor 1220 is a microprocessor. Alternatively, processor 1220 may be a different type of processor such as a parallel processor, or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processor 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processor 1220. Alternatively exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for estimating the spatiotemporal impact of an event, the method comprising:

receiving, by a processor, a plurality of social media posts, each of the social media posts comprising content, a timestamp, and a geolocation;

grouping, by the processor, the social media posts by geographic region in accordance with the geolocation associated with the social media post and by time window in accordance with the timestamp associated with the social media post to generate a plurality of groups of social media posts;

extracting, by the processor, one or more features from each group of social media posts to generate a plurality of feature vectors, each of the feature vectors corresponding to one group of social media posts;

supplying, by the processor, the feature vectors to one or more models of events to generate one or more classifications of the groups of social media posts, each of the one or more models of events corresponding to a different kind of event, and the classifications of the groups of the social media posts indicating the level of impact of the different kinds of events; and operating a device based on the classifications of the groups of social media posts.

2. The method of claim 1, wherein the operating the device based on the classifications of the groups of social media posts comprises displaying the classifications on a map, each of the classifications being shown on a portion of the map corresponding to the region associated with the classification.

3. The method of claim 2, wherein the operating the device based on the classifications of the groups of social media posts comprises displaying a sequence of maps, each map of the sequence of maps corresponding to a different time window.

4. The method of claim 3, wherein the operating the device based on the classifications of the groups of social media posts further comprises animating the sequence of maps.

5. The method of claim 1, wherein the extracting the one or more features from each group of social media posts comprises, for each group of social media posts, counting occurrences of one or more topics in the group of social media posts, each topic comprising one or more words, the counting occurrences of topics comprising identifying one or more of the words of a topic in the content of the social media post.

6. The method of claim 1, wherein the operating the device based on the classifications of the groups of social media posts comprises:

identifying an advertisement based on an event detected by a classification of a group; and transmitting the advertisement to a device located in a geographic region corresponding to the group.

7. The method of claim 1, further comprising identifying an event detected by a classification of a group, wherein the operating the device based on the classifications of the groups of social media posts further comprises dispatching emergency services to a geographic region corresponding to the group in accordance with the event.

8. The method of claim 1, wherein the operating the device based on the classifications of the groups of social media posts comprises transmitting data to a relevant user account.

9. The method of claim 8, wherein the relevant user account is a geographically related user account.

10. A method for training a plurality of models for detecting the spatiotemporal impact of an event, the method comprising:

receiving, by a processor, a plurality of social media posts, each of the social media posts comprising content, a timestamp, and a geolocation;

grouping, by the processor, the social media posts by geographic region in accordance with the geolocation associated with the social media post and by time window in accordance with the timestamp associated with the social media post to generate a plurality of groups of social media posts;

extracting, by the processor, a plurality of features from the social media posts to generate a plurality of feature vectors, each feature vector corresponding to one of the social media posts;

receiving, by the processor, labeled data corresponding to one or more classifications of the level of impact of the event in a plurality of geographic regions and a plurality of times;

assigning, by the processor, a classification to each of the groups of social media posts in accordance with the level of impact of the event on the geographic regions corresponding to the groups;

computing, by the processor, a causal impact between the plurality of features of each group and the classification of the group to identify one or more causally impacted features of the plurality of features;

generating, by the processor, a model relating the causally impacted features with the classifications; and returning, by the processor, the model.

11. The method of claim 10, wherein the classification of each of the groups comprises an unaffected classification and an affected classification, and wherein the computing the causal impact to identify one or more causally impacted features comprises, for each feature of the feature vector:

generating a time series of values for the feature from an affected group;

generating one or more time series of values for the feature from one or more unaffected groups;

estimating a first posterior predictive distribution utilizing the time series from the affected group and the one or more time series of values from the unaffected groups;

calculating a first p-value over multiple simulations of the first posterior predictive distribution;

estimating a second posterior predictive distribution utilizing the one or more time series of values from the unaffected groups, without the affected group;

calculating a second p-value over multiple simulations of the second posterior predictive distribution; and determining the feature as a causally impacted feature when the first p-value is less than 0.05 and the second p-value is greater than or equal to 0.05.

12. The method of claim 10, wherein the extracting the plurality of features comprises identifying a plurality of topics in the social media posts, the identifying the plurality of topics comprising:

removing stop words from the content of the social media posts;

removing low frequency words from the content of the social media posts; and applying a topic model to generate a plurality of topics, each of the topics comprising a plurality of words.

13. The method of claim 10, wherein the grouping the social media posts comprises sampling social media posts from the plurality of geographic regions of the labeled data.

14. The method of claim 13, wherein the grouping the social media posts further comprises sampling social media posts from regions outside the plurality of geographic regions of the labeled data.

15. A system for estimating the spatiotemporal impact of an event, the system comprising:

a processor; and memory coupled to the processor and having instructions stored thereon that, when executed by the processor, cause the processor to:

receive a plurality of social media posts, each of the social media posts comprising content, a timestamp, and a geolocation;

group the social media posts by geographic region in accordance with the geolocation associated with the social media post and by time window in accordance with the timestamp associated with the social media post to generate a plurality of groups of social media posts;

extract one or more features from each group of social media posts to generate a plurality of feature vectors, each of the feature vectors corresponding to one group of social media posts;

supply the feature vectors to one or more models of events to generate one or more classifications of the groups of social media posts, each of the one or more models of events corresponding to a different kind of event, and the classifications of the groups of the social media posts indicating the level of impact of the different kinds of events; and operate a device based on the classifications of the groups of social media posts.

16. The system of claim 15, wherein the memory further stores instructions that, when executed by the processor, cause the processor to operate the device based on the classifications of the groups of social media posts by displaying, on the device, the classifications on a map, each of the classifications being shown on a portion of the map corresponding to the region associated with the classification.

17. The system of claim 16, wherein the memory further stores instructions that, when executed by the processor, cause the processor to operate the device to display a sequence of maps, each map of the sequence of maps corresponding to a different time window.

18. The system of claim 17, wherein the memory further stores instructions that, when executed by the processor, cause the processor to operate the device to animate the sequence of maps.

19. The system of claim 15, wherein the memory further stores instructions that, when executed by the processor, cause the processor to extract the one or more features from each group of social media posts by, for each group of social media posts, counting occurrences of one or more topics in the group of social media posts, each topic comprising one or more words, the counting occurrences of topics comprising identifying one or more of the words of a topic in the content of the social media post.

20. The system of claim 15, wherein the memory further stores instructions that, when executed by the processor, cause the processor to operate the device based on the classifications of the groups of social media posts by:

identifying an advertisement based on an event detected by a classification of a group; and transmitting the advertisement to a device located in a geographic region corresponding to the group.

21. The system of claim 15, wherein the memory further stores instructions that, when executed by the processor, cause the processor to:

identify an event detected by a classification of a group; and dispatch emergency services to a geographic region corresponding to the group in accordance with the event.

22. A system for training a plurality of models for detecting the spatiotemporal impact of an event, the system comprising:

a processor; and memory coupled to the processor and having instructions stored thereon that, when executed by the processor, cause the processor to:

receive a plurality of social media posts, each of the social media posts comprising content, a timestamp, and a geolocation;

group the social media posts by geographic region in accordance with the geolocation associated with the social media post and by time window in accordance with the timestamp associated with the social media post to generate a plurality of groups of social media posts;

extract a plurality of features from the social media posts to generate a plurality of feature vectors, each feature vector corresponding to one of the social media posts;

receive labeled data corresponding to one or more classifications of the level of impact of the event in a plurality of geographic regions and a plurality of times;

assign a classification to each of the groups of social media posts in accordance with the level of impact of the event on the geographic regions corresponding to the groups;

compute a causal impact between the plurality of features of each group and the classification of the group to identify one or more causally impacted features of the plurality of features;

generate a model relating the causally impacted features with the classifications; and output the model.

23. The system of claim 22, wherein the classification of each of the groups comprises an unaffected classification and an affected classification, and wherein the memory further stores instructions that, when executed by the processor, cause the processor to identify the one or more causally impacted features by, for each feature of the feature vector:

generating a time series of values for the feature from an affected group;

generating one or more time series of values for the feature from one or more unaffected groups;

estimating a first posterior predictive distribution utilizing the time series from the affected group and the one or more time series of values from the unaffected groups;

calculating a first p-value over multiple simulations of the first posterior predictive distribution;

estimating a second posterior predictive distribution utilizing the one or more time series of values from the unaffected groups, without the affected group;

calculating a second p-value over multiple simulations of the second posterior predictive distribution; and determining the feature as a causally impacted feature when the first p-value is less than 0.05 and the second p-value is greater than or equal to 0.05.

24. The system of claim 22, wherein the memory further stores instructions that, when executed by the processor, cause the processor to extract the plurality of features by identifying a plurality of topics in the social media posts, the identifying the plurality of topics comprising:

removing stop words from the content of the social media posts;

removing low frequency words from the content of the social media posts; and applying a topic model to generate a plurality of topics, each of the topics comprising a plurality of words.

25. The system of claim 22, wherein the memory further stores instructions that, when executed by the processor, cause the processor to group the social media posts by sampling social media posts from the plurality of geographic regions of the labeled data.

26. The system of claim 25, wherein the memory further stores instructions that, when executed by the processor, cause the processor to group the social media posts by sampling social media posts from regions outside the plurality of geographic regions of the labeled data.

* * * * *